United States Patent [19]

Kuriyama et al.

[11] Patent Number: 4,725,943

[45] Date of Patent: Feb. 16, 1988

[54] METHOD AND APPARATUS OF SEQUENTIAL CONTROL FOR SAFETY FOR MACHINE TOOLS

[75] Inventors: Haruhiko Kuriyama; Toshiaki Anjo, both of Isehara, Japan

[73] Assignee: Amada Company, Limited, Japan

[21] Appl. No.: 751,856

[22] Filed: Jul. 5, 1985

[30] Foreign Application Priority Data

Jul. 9, 1984 [JP] Japan ............................. 59-140487

[51] Int. Cl.⁴ .............................................. G06F 11/00
[52] U.S. Cl. ........................................ 364/184; 364/474
[58] Field of Search ............... 364/184, 185, 186, 187, 364/474, 475; 371/62; 318/626

[56] References Cited

U.S. PATENT DOCUMENTS

| | | | |
|---|---|---|---|
| 3,908,117 | 9/1975 | Naruse et al. | 371/62 |
| 4,210,226 | 7/1980 | Ichioka | 371/62 |
| 4,254,473 | 3/1981 | Galdun | 364/900 |
| 4,263,647 | 4/1981 | Merrell | 364/186 |
| 4,369,401 | 1/1983 | Fayfield et al. | 318/626 |
| 4,567,560 | 1/1986 | Polis | 371/16 |

Primary Examiner—Jerry Smith
Assistant Examiner—Allen MacDonald
Attorney, Agent, or Firm—Wigman & Cohen

[57] ABSTRACT

A method and apparatus for safety control for a numerically controlled machine tool, including outputting a control signal to the machine tool based upon a code signal received from a numerical control means; outputting a completion signal to the numerical control means when an operation completion signal is received from the machine tool; and outputting a stop signal to the means to stop the machine tool if no operation completion signal is received within a predetermined time.

4 Claims, 3 Drawing Figures

METHOD AND APPARATUS OF SEQUENTIAL CONTROL FOR SAFETY FOR MACHINE TOOLS

BACKGROUND OF THE INVENTION

1. Field of the Invention

The present invention relates to a method and apparatus for safety control for numerically controlled machine tools and, more particularly, pertains to a method and apparatus of sequential control for safety for controlling sequence operations of the numerically controlled machine tools.

2. Description of the Prior Art

In numerically controlled machine tools, a variety of operations such as starting, moving and stopping of elements are sequentially performed under sequential control. Such a numerically controlled machine tool is provided with an NC means which is equipped with external operation functions such as T function (tool function) and M function (miscellaneous function) to control movable elements of the machine tool. The arrangement is such that an operation completion signal is sent from the machine tool to the NC means after each completion of operations to control sequence operations according to the external functions.

Heretofore, it has been disadvantageous that the numerically controlled machine tool of such arrangement will apparently remain stopped if an operation completion signal is not sent to the NC means when something is wrong with the machine tool. The trouble is that the machine tool which has apparently remained stopped will suddenly start to move contrary to the expectation of the operator of the machine tool if the cause for which the operation completion signal has not been sent to the NC means is removed for some reason. This is of course very dangerous to the operator who will be checking most of the time the machine tool to find out the cause for which it has been stopped.

SUMMARY OF THE INVENTION

It is an object of the present invention to provide a method and apparatus of sequential control for safety which can completely stop a numerically controlled machine tool to be controlled in an abnormal situation by preventing an operation completion signal from being sent to the NC means.

It is another object of the present invention to provide a method and apparatus of sequential control for safety for a numerically controlled machine tool in which it does not take much time from one step of sequence operations to the next step.

It is another object of the present invention to provide a method and apparatus of sequential control for safety which can stop a numerically controlled machine tool by finding an abnormal condition when an operation will not be completed within a predetermined time.

In order to attain these objects according to the present invention, a timer is so provided as to begin to measure time from the sending of an external operation signal and send a stop signal to the NC means to stop the numerically controlled machine tool in case that an operation completion signal will not be sent to the timer within a predetermined time.

Other and further objects and advantages of the present invention will be apparent from the following description and accompanying drawings which, by way of illustration, show a preferred embodiment of the present invention and the principles thereof.

DESCRIPTION OF THE PREFERRED EMBODIMENTS

Figure 1:
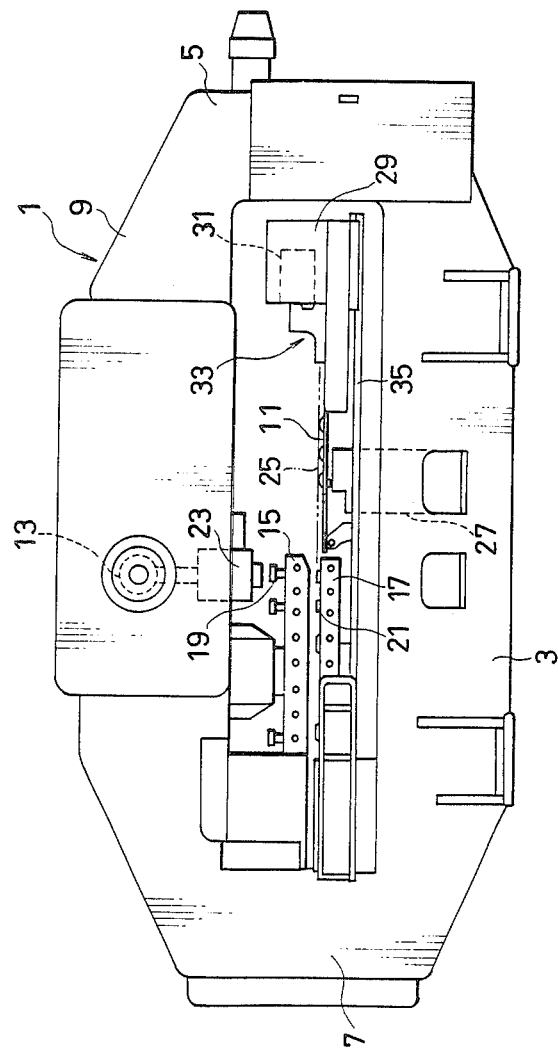
FIG. 1 is a front elevational view of a turret punch press as an example of a numerically controlled machine tool with the method and apparatus of sequential control for safety according to the principles of the present invention.

Referring to FIG. 1, there is shown a turret punch press 1 for punching a sheet-like workpiece W such as sheet metal in which the principles of the present invention can be embodied for the purpose of describing the principles of the present invention. However, it is to be initially noted that the present invention is not limited in application to the turret punch press 1 and it is applicable to various types of machine tools which are numerically controlled.

The turret punch press 1 is constructed of a base 3, a pair of side frames 5 and 7 vertically fixed or formed to the ends of the base 3, and an overhead frame 9 which is supported over the base 3 by the side frames 5 and 7. The base is provided at its top with a work-table 11 on which the workpiece W to be punched is horizontally fed and positioned. Also, the turret punch press 1 comprises a ram 13 and a pair of an upper turret 15 and a lower turret 17 holding a plurality of upper tools 19 and lower tools 21, respectively, which are varied in size and shape to punch the workpiece W. The ram 13 is vertically movably mounted at the substantially midway portion of the overhead frame 9 to be vertically driven by power by an eccentric shaft 23 so as to act on the upper and lower tools 19 and 21 placed therebeneath to punch the workpiece W. The upper turret 15 is so mounted as to rotatably hang from the overhead frame 9 with its shaft vertical to rotate partially beneath the ram 13, while the lower turret 17 is rotatably mounted on the base 3 just beneath the upper turret 15 in a coaxial relation therewith. Also, the upper and lower turrets 15 and 17 are so arranged that pairs of the upper and lower tools 19 and 21 common in size and shape vertically align with each other. In this arrangement, they are simultaneously driven by power to bring a desired pair of the upper and lower tools 19 and 21 beneath the ram 13 to punch a hole of a desired size and shape in the workpiece W.

In order to remove scraps and blanks cut from the workpiece W, a swingable chute table 25 is pivotally provided at the end of the work-table 11 near the upper and lower turrets 15 and 17, and a chute drum 27 is vertically provided beneath the chute table 25. The chute table 25 is so arranged as to be usually kept horizontal on a level with the work-table 11 but is pivotally sloped to enable scraps or blanks brought thereon to slide down into the chute drum 27. In this connection, most scraps cut from the workpiece W are dropped through the holes of the lower tools 21, and only larger scraps and blanks cut from the workpiece W by nibbling operations, which will be described hereinafter, are removed by the chute table 25 into the chute drum 27.

In order to feed and position the sheet-like workpiece W to be punched, the turret punch press 1 is provided with a first carriage 29 which is movable toward and away from the upper and lower turrets 15 and 17 and a second carriage 31 which is slidably mounted on the first carriage 29 and holds a clamping apparatus 33 clamping the workpiece W. The first carriage 29 is slidably mounted on rails 35 which are fixed on the upper portion of the base 3 so that it may be horizontally moved toward and away from the upper and lower turrets 15 and 17 when driven by power. The second carriage 31 holding the clamping apparatus 33 is mounted on the first carriage 29 so that it may be horizontally moved by power in directions at right angles with the rails 35. The clamping apparatus 33 for clamping the workpiece W are usually a pair in number but may be more than two, and they are detachably and adjustably fixed to the second carriage 31 so that they may be adjusted in a horizontal position on the second carriage 31 according to the width of the workpiece W.

In the above described arrangement, the workpiece W which is gripped by the clamping apparatus 27 can be fed between the upper and lower turrets 15 and 17 and positioned just beneath the ram 13 by moving the first and second carriages 29 and 31. Before or as soon as the workpiece W is positioned between the upper and lower turrets 15 and 17 just beneath the ram 13, desired pair of the upper and lower tools 19 and 21 are placed just beneath the ram 13 by the upper and lower turrets 15 and 17, and thus the workpiece W is punched by the upper and lower tools 19 and 21 when the ram 13 is lowered by the eccentric shaft 23 to press the upper tool 19. Thus, a number of holes varied in size and shape are automatically and continuously punched in the workpiece W by rotating the upper and lower turrets 15 and 17 and moving the first and second carriages 29 and 31 under a numerical control which is programmed.

Also, the workpiece W can be nibbled or continuously punched to form a single cut or hole larger than the sizes of the upper and lower tools 19 and 21 when it is continuously fed little by little into between a pair of small and round upper and lower tools 19 and 21 with the ram 13 continuously stroked. The workpiece W can be formed with an elongated hole when fed straightly to be nibbled, and it will be circularly cut out to have a large circular hole when circularly fed in nibbling. Thus, holes and blanks larger than the sizes of the upper and lower tools 19 and 21 can punched in and from the workpiece W through nibbling operations. Also, larger scraps and blanks cut from the workpiece W in nibbling operations are dropped onto the chute table 25 and then slid down into the chute drum 25.

Figure 2:
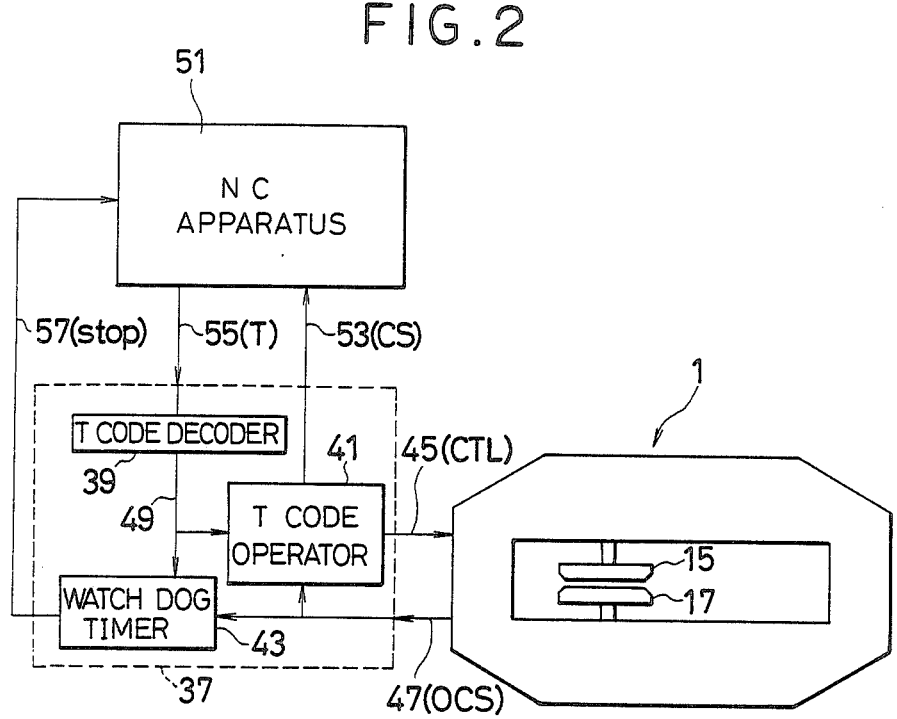
FIG. 2 is a block diagram embodying the method and apparatus of sequential control for safety according to the principles of the present invention.

Referring now to FIG. 2, there is shown a block diagram of sequential control for safety according to the principles of the present invention under which the turret punch press 1 is numerically controlled. Although there are some functions of the turret punch press 1 to be numerically sequentially controlled, the invention will be described as to what is referred to as T function (tool function) which designates generally the rotation and positioning of the upper and lower turrets 15 and 17 in the turret punch press 1. As has been described hereinbefore, the upper and lower turrets 15 and 17 are rotated to bring and position a desired pair of the upper and lower tools 19 and 21 just beneath the ram 13 one after another to continuously punch the workpiece W. However, it is to be noted that other functions such as M function (miscellaneous function) including the nibbling operation and the function of the chute table 25 can be controlled in the same manner as the T function.

The turret punch press 1 is connected with a sequencer 37 which comprises a T code decoder 39, a T code operator 41 and a watch dog timer 43. The turret punch press 1 is connected to the T code operator 41 by a line 45 for control signal (CTL) and is also connected to the T code operator 41 and the watch dog timer 43 by a line 47 for operation completion signal (OCS). The T code operator 41 and the watch dog timer 43 are connected to the T code decoder 39 by a line 49 for T code signal. The T code operator 41, the watch dog timer 43 and the T code decoder 39 are connected to an NC apparatus 51 by a line 53 for completion signal (CS), a line 55 for T code (T) and a line 57 for stop signal (STOP), respectively.

The T code decoder 39 is so arranged as to decode the T code signal (T) outputted from the NC apparatus 51 and send it to the T code operator 41 and the watch dog timer 43. The T code operator 41 is so arranged as to output the control signal (CTL) corresponding to the T code signal (T) from the T code decoder 39 to the turret punch press 1 and also receive the operation completion signal (OCS) therefrom and then send the completion signal (CS) to the NC apparatus 51. The operation completion signal (OCS) is sent from the turret punch press 1 to the sequencer 37 by actuating means such as limit switches on each completion of the operations such as the rotation and the positioning of the upper and lower turrets 15 and 17. Also, the completion signal (CS) is sent from the T code operator 41 of the sequencer 37 to the NC apparatus 51 after the upper and lower turrets 15 and 17 have been completely positioned, that is, after all the operation completion signals (OCS) have been received by the T code operator 41. The watch dog timer 43 is so arranged as to start to measure time on receiving the T code signal (T) from the T code decoder 39 and also receive the operation completion signal (OCS) from the turret punch press 1 on completion of the operations corresponding to the T code signal (T). Also, as a matter of importance, the watch dog timer 43 is so arranged as to be cleared on receiving the operation completion signal (OCS), or to send a stop signal (STOP) to the NC apparatus 51 if it does not receive the operation completion signal (OCS) from the turret punch press 1 with a predetermined time. Thus, when the operation completion signal (OCS) is not sent to the watch dog timer 43 because something is wrong with the turret punch press 1, the watch dog timer 43 will send the stop signal (STOP) to the NC apparatus 51 to stop the turret punch press 1 from operating.

As has been described hereinbefore, other functions of the turret punch press 1 than the T function are controlled in all the same manner as the T function which has been described immediately in the above. Accordingly, in order to control the M functions such as the nibbling operation and swinging the chute table 25, an M code decoder, an M code operator and a watch dog timer are provided in place of the T code decoder 39, the T code operator 41 and the watch dog timer 43, respectively, for the T function. However, the watch dog timer 43 can be used in common for the T and M functions and other functions to send the stop signal to the NC apparatus 51 when some trouble happens in the turret punch press.

In the above described arrangement, the sequencer 37 will read the T code signal (T) corresponding to the T code outputted from the NC apparatus 51 and send a control signal to the turret punch press 1 to rotate and position the upper and lower turrets 15 and 17 at a desired position.

Figure 3:
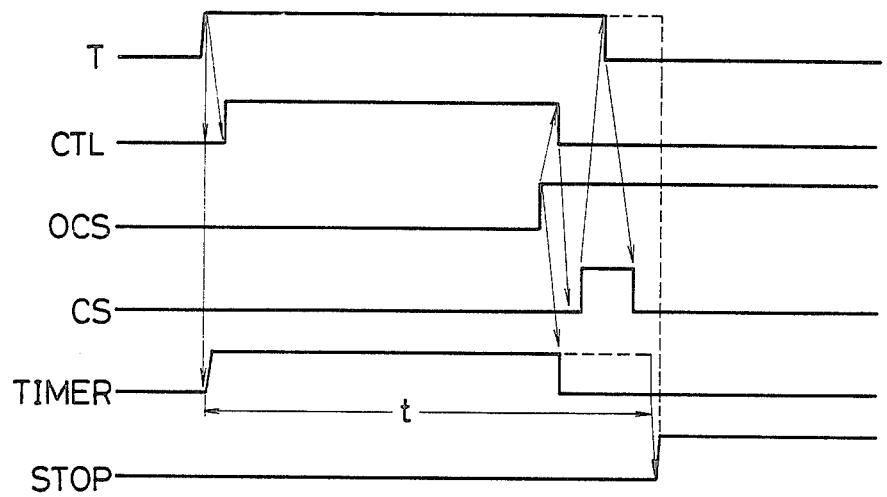
FIG. 3 is a timing diagram for the block diagram shown in FIG. 2.

Referring to FIG. 3, there is shown a timing diagram which shows sequential relations of the signals of the above described arrangement for controlling the sequence operations of the turret punch press 1. When the T code signal (T) is sent from the NC apparatus 51 to the T code decoder 39, it is decoded by the T code decoder 39 and then is inputted to the T code operator 41 and the watch dog timer 43. In this sequence, the T code signal (T) from the NC apparatus 51 will increase and be sent to the T code operator 41 and sequentially the control signal (CTL) from the T code operator 41 will increase and then be sent to the turret punch press 1. Accordingly, the punch press 1 will start to operate to rotate and position the upper and lower turrets 15 and 17 according to the control signal (CTL) from the T code operator 41. At the same time, the watch dog timer 43 will start to measure time in response to the increase of the T code signal (T) from NC apparatus 51.

Under normal conditions, the turret punch press 1 will output the operation completion signal (OCS) to the T code operator 41 and the watch dog timer 43 after having completed the operation according to the T code signal (T) to rotate and position the upper and lower turrets 15 and 17. In this sequence, the operation completion signal (OCS) will increase and then the control signal (CTL) will drop down and simultaneously the watch dog timer 43 will be cleared. After the control signal (CTL) has dropped down, the completion signal (CS) will increase to be sent to the NC apparatus 51, and sequentially the T code signal (T) will drop down and then the completion signal (CS) will drop down to complete one cycle of the sequential operations.

If something is wrong with the turret punch press 1, the operation completion signal (OCS) will not be outputted and the watch dog timer 43 will continue to measure time as shown by the dashed lines in FIG. 3 and will send the stop signal (STOP) to the NC apparatus 51 in a predetermined time (t). On receiving the stop signal (STOP), the NC apparatus 51 will stop sending the T code signal (T) and stop the NC turret punch press 1 from operating.

It will be understood by those skilled in the art that the NC apparatus 51 will subsequently send the next signal for the next operation such as M function and another T function to the sequencer 37 after the rotation and positioning of the upper and lower turrets 15 and 17 as the T function have been completed.

In the above described arrangement, the sequencer 37 will read the T code signal (T) outputted from the NC apparatus 51 and send a control signal (CTL) to the turret punch press 1 to rotate and position the upper and lower turrets 15 and 17 at a desired position. When the upper and lower turrets 15 and 17 are normally operated to position a desired pair of upper and lower tools 19 and 21 just beneath the ram 13, the operation completion signal (OCS) will be sent to the T code operator 41 and the watch dog timer 43. When the operation completion signal (OCS) has been sent from the turret punch press 1, the T code operator 41 will send the completion signal (CS) to the NC apparatus 51 and the watch dog timer 43 will be cleared. However, if the operation completion signal (OCS) is not sent within a predetermined time (t) because of some trouble in the turret punch press 1, the watch dog timer 43 will send the stop signal (STOP) to the NC apparatus 51 to the stop the turret punch press 1 from operating. In this arrangement, even if the cause of the trouble of the turret punch press 1 could be removed for some reason and the operation completion signal (OCS) could be suddenly sent, the NC apparatus 51 would not send any signal for sequential operations to move the turret punch press 1. Thus, the watch dog timer 43 according to the present invention will prevent the turret punch press 1 from suddenly moving and hurting the operator the turret punch press and also the workpiece W and so on after having once stopped moving for one cause or another.

Although a preferred form of the present invention has been illustrated and described, it should be understood that the device is capable of modification by one skilled in the art without departing from the principles of the invention. Accordingly, the scope of the invention is to be limited only by the claims appended hereto.

We claim:

1. A method for safety control for sequential control operation of a machine tool by a numerical control means acting in cooperation with a sequencer means to prevent unsafe operation of said machine tool, comprising the steps of:

generating a code signal by said numerical control means;

applying said code signal to said sequencer means;

outputting a control signal from said sequencer means to the machine tool by a code operator in response to the code signal generated by the numerical control means;

outputting a completion signal to said numerical control means by said code operator to continue sequential control operation of said machine tool when an operation completion signal is outputted by the machine tool; and outputting a stop signal from said sequencer means to the numerical control means by a timer means to stop said numerical control means if no operation completion signal is outputted by the machine tool within a predetermined time.

2. A method for safety control according to claim 1, further comprising the steps of:

activating said timer means in response to the code signal; and deactivating the timer means in response to the operation completion signal in the predetermined time during which the operation completion signal is to be outputted by the machine tool.

3. An apparatus for safety control for sequential control operation of a machine tool to prevent unsafe operation of said machine tool, comprising:

numerical control means for supplying a control signal for operation of the machine tool;

sequencer means for receiving the control signal supplied by said numerical control means and controlling sequential operation of the machine tool, said sequencer means including;

means for outputting the control signal to the machine tool in response to a code signal outputted by the numerical control means;

means for outputting a completion signal to the numerical control means in response to an operation completion signal outputted by the machine tool to continue sequential control operation;

timer means activated in response to the code signal outputted by said numerical control means and deactivated in response to the operation completion signal from the machine tool, for outputting a stop signal to said numerical control means to interrupt the unsafe operation of the machine tool only when said timer means is not deactivated in response to the operation completion signal within a predetermined time.

4. An apparatus for safety control for sequential control operation of a machine tool by numerical control means to prevent unsafe operation of said machine tool, which machine tool outputs an operation completion signal upon completion of the sequential operation, comprising:

sequencer means for receiving a code signal for operation of the machine tool supplied by said numerical control means, said sequencer means including;

a code decoder which decodes the code signal outputted by the numerical control means;

a code operator which outputs a control signal according to the code signal to the machine tool in response to the code signal decoded by the code decoder and outputs a completion signal to the numerical control means in response to the operation completion signal outputted by the machine tool; and watch dog timer means which is activated in response to the code signal decoded by the code decoder and is deactivated in response to the operation completion signal outputted by the machine tool, for ouputting a stop signal to said numerical control means to interrupt the unsafe operation of the machine tool only when said watch dog timer means is not deactivated in response to the operation completion signal within a predetermined time.

* * * * *